United States Patent
Albus et al.

(10) Patent No.: US 6,862,357 B1
(45) Date of Patent: Mar. 1, 2005

(54) VEHICLE AUDIO SYSTEM

(75) Inventors: Rainer Albus, Dormettingen (DE); Adel Bauer, Ludwigsburg (DE); Norbert Niemczyk, Pforzheim (DE)

(73) Assignee: DaimlerChrysler AG, Stuttgart (DE)

( * ) Notice: Subject to any disclaimer, the term of this patent is extended or adjusted under 35 U.S.C. 154(b) by 796 days.

(21) Appl. No.: 09/628,672

(22) Filed: Jul. 28, 2000

(30) Foreign Application Priority Data

Jul. 28, 1999 (DE) .......................... 199 35 238

(51) Int. Cl.⁷ .............................................. H04B 1/00
(52) U.S. Cl. .............................. 381/86; 381/20; 381/18; 455/575.9
(58) Field of Search .............................. 381/86, 17, 18, 381/20; 455/575.9

(56) References Cited

U.S. PATENT DOCUMENTS 6,157,725 A * 12/2000 Becker .......................... 381/86

FOREIGN PATENT DOCUMENTS

| EP | 0883264 | 12/1998 |
|---|---|---|
| EP | 0887971 | 12/1998 |
| JP | 07-154890 | 6/1995 |
| JP | 11-119754 | 4/1999 |

OTHER PUBLICATIONS

"A Distributed Architecture Car Audio System", Hiroshi Tajima and Makoto Araki; Yoshihiro Bessho and Masanobu Mizuno; Kenzo Tanabe; pp. 85–97; *Transportation Electronics: Proceedings of the international congress on transportation electronics (P–183)*, Warrendale, PA, USA, SAE, Oct. 1986.

* cited by examiner

Primary Examiner—Melur Ramakrishnaiah
(74) Attorney, Agent, or Firm—Crowell & Moring LLP

(57) ABSTRACT

A vehicle audio system has an audio central unit to which one or more further audio components are connected via an associated first data bus, and are interfaced for data communication between the first data bus and a second data bus of another type in the vehicle. One of the audio components is an audio gateway unit which contains the interface, and is an independent component separate from the audio central unit. In addition to the data bus gateway functions, the audio gateway unit includes further standard audio functions spanning vehicle types or countries, or further audio functions which are implemented so as to be parameterizable according to specific vehicle type and/or country.

4 Claims, 1 Drawing Sheet

VEHICLE AUDIO SYSTEM

BACKGROUND AND SULTRY OF THE INVENTION

This application claims the priority of 199 35 238.0, 28 Jul. 1999, the disclosure of which is expressly incorporated by reference herein.

The invention relates to a vehicle audio system having an audio central unit used to connect one or more further audio components to one another via an associated first data bus, and having an interface for data communication between the first data bus and a second data bus of another type in the vehicle.

An example of a distributed system architecture is described in the publication H. Tajima et al., A Distributed Architecture Car Audio System, Transportation Electronics: Proceedings of the International Congress on Transportation Electronics, Warrendale, Pa., USA, SAE, October 1986, page 85. In addition, a vehicle audio system of the type mentioned above, shown schematically in FIG. 2, is known from vehicles of the applicant.

As FIG. 2 shows, this audio system contains an optical ring data bus 1, e.g. of the type commonly known by the abbreviation MOST, which is used to connect a plurality of audio components to one another. One of these forms an audio central unit 2 (also called a head unit) in which numerous functions are implemented, such as user interface control, bus master function, priority management, diagnosis function, radio and amplifier function etc. In addition, this conventional central unit 2 contains an interface for data communication between the audio data bus 1 and a second data bus 3 of the vehicle, e.g., a data bus commonly known by the abbreviation CAN-B, which connects various vehicle control units to one another. The audio central unit 2 uses the second data bus 3 to access a combination instrument 4, particularly for display purposes, and to access the rest of the "vehicle control unit environment" (e.g., to realize a diagnosis function and a multipurpose steering wheel function in which one or more audio functions can be controlled on the steering wheel by the system user). The audio central unit 2 controls the other available audio components (in the example shown a car telephone unit 5, a voice control system 6 and a sound system 7), which is an addition to the equipment of a standard system that increases convenience.

The overall range of tasks of the conventional audio central unit 2 is therefore very comprehensive and complex, with at least some of these functions being different according to specific vehicle type and/or country, for various types of vehicle and countries of use. Furthermore, the respective audio components are often supplied by various component manufacturers for different types of vehicle (including different series), and/or for different countries, which lowers the number of units produced for each individual variant, even, and specifically, regarding the conventional audio central unit 2. As a further consequence, a relatively large amount of testing needs to be involved for the respective audio system.

A further problem in the conventional system is the different loudspeaker system connection. In a standard layout, contact is made with loudspeakers directly at the central unit, whereas, in the case of a convenience-enhancing layout containing the sound system 7, the loudspeakers are connected there and the output stages of the central unit 2 are then redundant and remain unused. For future standard systems, the four output stages used today will probably no longer be adequate; for technical reasons, it is very difficult or impossible to increase the number of output stages in the central unit 2.

One object of the invention is to provide a vehicle audio system of the type mentioned above which can be used for different types of vehicles and different countries, with comparatively little complication.

This and other objects and advantages are achieved by the vehicle audio system according to the invention, which includes an audio gateway unit as a separate component from the audio central unit. The audio gateway component not only acts as an interface for data communication between the audio data bus and another data bus of a different type in the vehicle, but also has one or more further functions implemented in it. The latter functions are those which are standard for various types of vehicle and/or countries of use, or those which can be parameterized in the audio gateway unit according to specific vehicle type and/or country and which can thus be matched to the respective type of vehicle and the respective country of use.

In this way, the audio central unit can be designed to be unencumbered by these functions, thereby significantly reducing its complexity as compared with the conventional system described above and shown in FIG. 2. This reduction in functions to be managed by the audio central unit generally means that fewer variants of the audio central unit are necessary for the various types of vehicle and countries of use. By implementing a loudspeaker output stage function in the audio gateway unit together with a sound system function, the audio central unit can be designed without such an output stage, so that the output stage is prevented from possibly remaining unused. As far as functions which are standard in terms of their spanning vehicle types and/or countries are concerned, a standard design of the audio gateway unit can be used for all types of vehicle and countries of use. As far as the functions which can be parameterized according to specific vehicle type and/or country are concerned, the audio gateway unit can be matched, by appropriate parameterization and hence relatively easily, to the particular instance of vehicle type and to the instance of the country of use, without the need for a great diversity of variants.

In one embodiment of the invention, with claim 2, one or more of the "amplifier", "tuner", "bus master" and "warning tone management" functions are implemented in the audio gateway unit, so that the associated audio central unit does not need to contain the relevant functions.

Other objects, advantages and novel features of the present invention will become apparent from the following detailed description of the invention when considered in conjunction with the accompanying drawings.

DETAILED DESCRIPTION OF THE DRAWINGS

Figure 1:
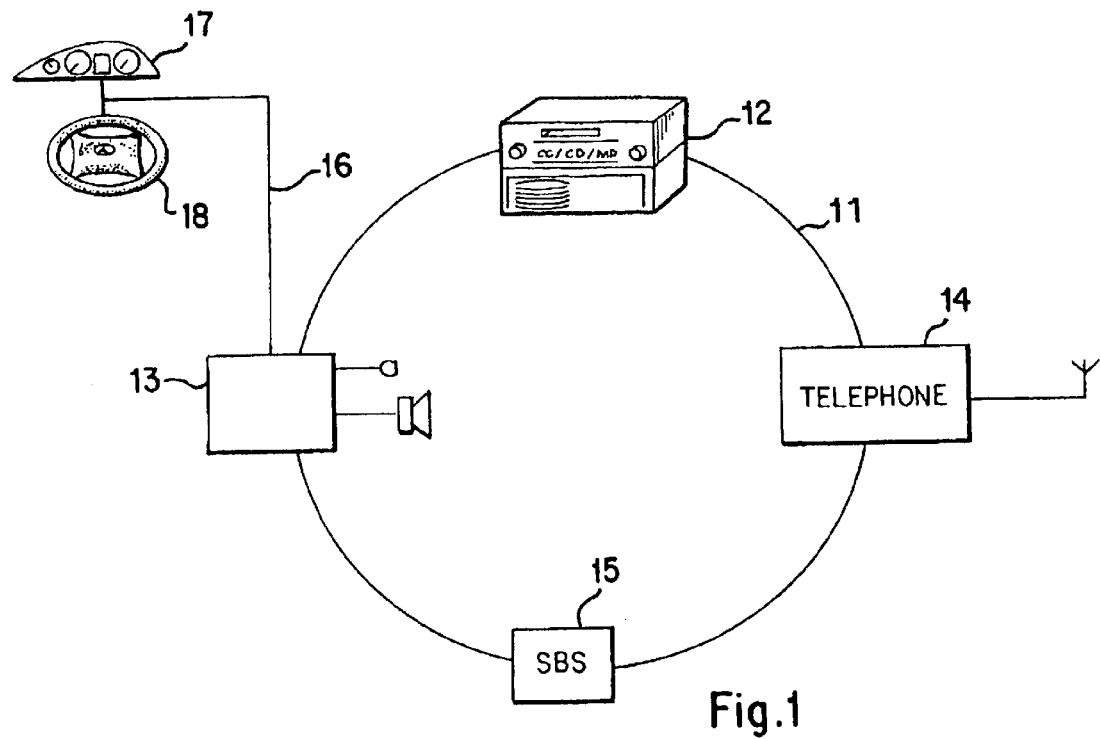
FIG. 1 shows a schematic block diagram of a vehicle audio system according to the invention.

The vehicle audio system shown schematically in FIG. 1 contains an audio data bus 11 in a ring structure (e.g., in the form of a MOST ring bus), which is used to connect an audio central unit 12, an audio gateway unit 13, a car telephone unit 14 and a voice control system unit 15 to one another.

Figure 2:
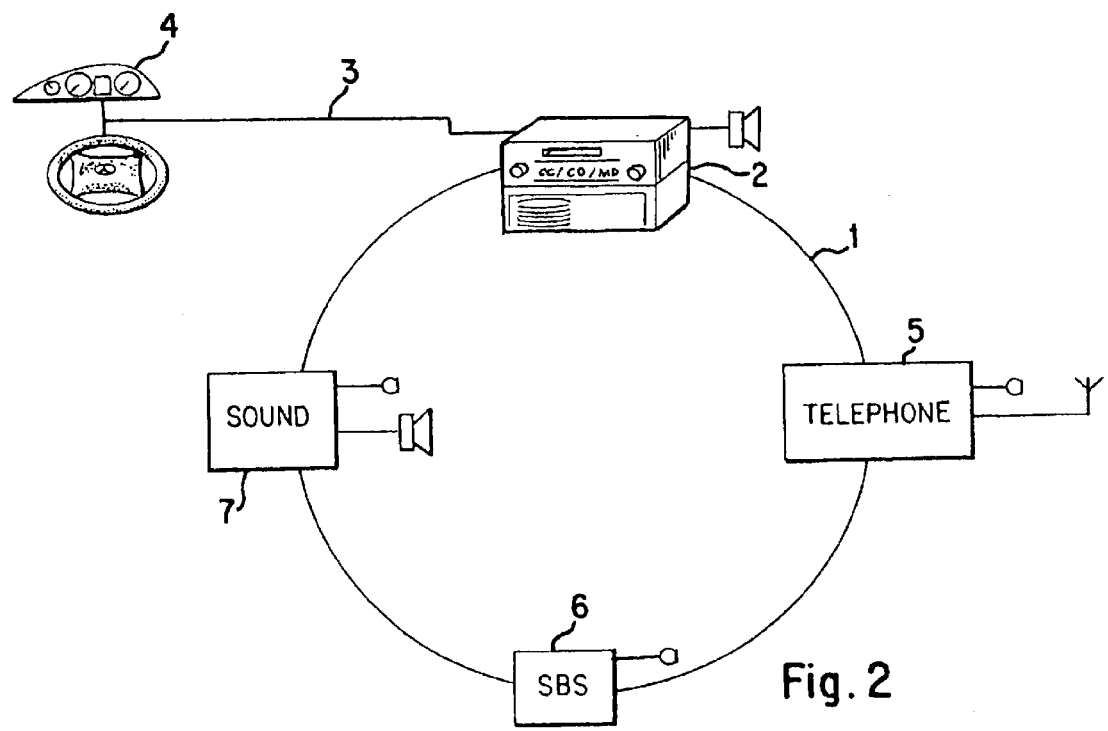
FIG. 2 shows a schematic block diagram of a conventional vehicle audio system.

Compared with the conventional system of FIG. 2, the audio central unit 12 in the system according to the invention can be functionally much less complex. Like the conventional central unit 2, it is used as the front end and for user interface (MMI) control, but is largely free of the audio functions of the conventional central unit 2. In the system according to the invention, these further functions are implemented in the audio gateway unit 13, which is provided as an independent component in addition to the reduced-function audio central unit 12.

In the first instance, the audio gateway unit 13 forms the gateway interface between the audio data bus 11 and a further data bus 16 in the vehicle, for example a data bus of the type CAN-B, which is used to connect the audio system to the rest of the "vehicle environment", in particular to a combination instrument 17 used primarily for display functions, to a multifunction steering wheel 18 and vehicle components which are relevant to diagnosis, and to warning tone request means. The further functions implemented in the audio gateway unit 13 in addition to this interface function are uniform for various types of vehicle, including various vehicle series, and/or various countries of use and are thus standard, requiring no matching specific to vehicle type or country. Alternatively, they are stored such that they can be parameterized in the audio gateway unit 13 according to specific vehicle type and/or country, and can therefore be matched using appropriate parameterization.

In this way, the audio gateway unit 13 realizes an audio system component which spans vehicle types and countries and which contains one or more of the following sets of functions, depending on application instance and requirement. First, an amplifier function with a loudspeaker connection is preferably implemented which can be used both for a standard system and for a sound system, so that the audio central unit 12 does not need an amplifier. Second, the audio gateway unit 13 with its interface function serves to provide data interchange with the combination instrument 17 and with the multifunction steering wheel 18 for the purposes of diagnosis and to interchange information with standardized audio-related terminals in the vehicle electrics. Third, the audio gateway unit 13 can include central warning tone management, which is particularly advantageous because the audio gateway unit 13 can be used to produce a direct connection to the "vehicle environment", i.e. the rest of the vehicle electrics, and to produce a direct loudspeaker connection. Fourth, a diagnosis function for performing offboard diagnoses is preferably provided. Fifth, a bus master function for network management in the audio gateway unit 13 can be implemented as a further option. Sixth functions which can be implemented are applications for starting up and stopping the telematics components contained in the audio system. A seventh function concerns the implementation of central administration of the resources, i.e. in particular the capacity of the data transmission channels. Eighth, it is preferable, as mentioned above, for a central loudspeaker connection to be possible from the audio gateway unit 13. A ninth set of functions to be mentioned is the possibility of flexible connection of a subwoofer both for a standard system and for a sound system via the audio gateway unit 13. The tenth function characteristic which can be provided is the connection of not just one but a plurality of microphones to the audio gateway unit 13, e.g., for a "noise reduction" sound application, a telephone hands-free mode and for the voice control system 15. The eleventh set of functions which should be mentioned is the implementation of the tuner function in the audio gateway unit 13.

Providing the audio gateway unit 13, which is separate from the audio central unit 12 and has the aforementioned function options, allows the following advantages, in particular, to be obtained as compared with the conventional system of FIG. 2.

The complexity of the audio system and, in particular, of the audio central unit is reduced. Manufacturers and suppliers of the individual components of the audio system do not need overall knowledge of the system, but need know only about individual functions. The use of standard components in the system to span countries and types of vehicle reduces the work involved in development and testing, both for the vehicle manufacturer and the component manufacturer. The central warning tone management allows warning tones to be generated quickly without further delay, specifically at the front, back, to the left and to the right of the vehicle as required, even in the event of a data bus ring dropout.

The use of a GAL (speed-dependent volume) function is not necessary; it is equally possible to use a higher-grade DRO function, as in the sound system. Digital processing of the audio data can be used even with the standard system. The processing of the microphone signals at a central point in the audio gateway unit allows better telephone and voice control system quality to be achieved. Test steps, such as testing the loudspeakers using the microphone, can be automated during the production process. The special "sound system" equipment can easily be retrofitted by simply replacing the audio gateway unit with one having an appropriately higher grade of equipment. The temperature and cabling situation in the vehicle tunnel dome region can easily be kept non critical, and standard connector designs can be used. An anti-theft function is not necessary in the audio central unit, since, in the minimum configuration, at least two components are required to execute the principal functions, namely the audio gateway unit in addition to the audio central unit. The audio central unit, which is preferably built in said dome region, is relatively easy to match to the prevailing circumstances on account of its lower complexity and the interface functions which are relieved as a result of this. In addition, the audio gateway unit can easily be used to expand the number of amplifier output stages which is selected nowadays.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle audio system comprising:
   an audio central unit to which at least one further audio component is connected via an associated first data bus; and
   an interface for data communication between the first data bus and a second vehicle data bus of a different type; wherein:
   one of said at least one further audio component is an audio gateway unit that contains the interface, and is an independent component separate from the audio central unit; and
   in addition to data bus gateway functions, said audio gateway unit performs at least one of further audio functions which are standard among vehicle types or countries, and further audio functions which are parameterizable according to specific vehicle type or country.

2. The vehicle audio system according to claim 1, wherein said audio gateway unit performs at least one of an amplifier function, a tuner function, a bus master function and a warning tone management function.

3. A vehicle communications system, comprising:

a first databus;

a second databus of a type different from said first databus;

a central audio unit connected to communicate via said first data bus for controlling functions implemented via said first databus;

a plurality of further audio components coupled to communicate via said first databus, said plurality including an audio gateway for performing at least one of standard audio functions which are compatible with a plurality of vehicle types or countries and further audio functions which are parameterizable according to specific vehicle type or country; and an interface for data communication between the first and second databuses, said interface being contained in said audio gateway unit, which is an independent component, separate from said audio central unit.

4. The vehicle communications system according to claim 3, wherein said second databus is coupled to communicate with vehicle electronic systems other than said audio components connected to the first database.

* * * * *